United States Patent [19]
McGregor et al.

[11] Patent Number: 5,750,931
[45] Date of Patent: *May 12, 1998

[54] ELECTRICAL CABLE WITH IMPROVED INSULATION AND PROCESS FOR MAKING SAME

[75] Inventors: Gordon L. McGregor, Landenberg, Pa.; Raymond B. Minor, Elkton, Md.; William Hardie, Landenberg, Pa.; Michael Kennedy, Elkton, Md.

[73] Assignee: W. L. Gore & Associates, Inc., Newark, Del.

[*] Notice: The term of this patent shall not extend beyond the expiration date of Pat. No. 5,429,869.

[21] Appl. No.: 457,439

[22] Filed: Jun. 1, 1995

Related U.S. Application Data

[60] Division of Ser. No. 166,118, Dec. 13, 1993, Pat. No. 5,468,314, which is a continuation-in-part of Ser. No. 23,642, Feb. 26, 1993, Pat. No. 5,429,869.

[51] Int. Cl.$^6$ ..................................... H01B 7/00
[52] U.S. Cl. ...................... 174/110 PM; 174/120 R
[58] Field of Search .................. 174/105 R, 106 R, 174/107, 110 PM, 120 R

[56] References Cited

U.S. PATENT DOCUMENTS

| | | | |
|---|---|---|---|
| 2,518,454 | 8/1950 | Elliott | 174/114 |
| 3,309,458 | 3/1967 | Yoshimura et al. | 174/107 |
| 3,573,976 | 4/1971 | Duane | 117/217 X |
| 3,615,972 | 10/1971 | Morehouse et al. | 156/79 |
| 3,953,566 | 4/1976 | Gore | 264/288 |
| 4,098,945 | 7/1978 | Oehmke | 428/327 |
| 4,108,806 | 8/1978 | Cohrs et al. | 521/54 |
| 4,118,531 | 10/1978 | Hauser | 428/224 |
| 4,153,661 | 5/1979 | Ree et al. | 264/120 |
| 4,204,086 | 5/1980 | Suzuki | 174/102 R |
| 4,269,638 | 5/1981 | Faranetta et al. | 156/53 |
| 4,273,806 | 6/1981 | Stechler | 427/119 |

(List continued on next page.)

FOREIGN PATENT DOCUMENTS

| | | |
|---|---|---|
| 0387796 | 3/1990 | European Pat. Off. . |
| 3415746 | 10/1985 | Germany . |
| 2-160312 | 6/1990 | Japan . |
| 3-167563 | 6/1990 | Japan . |
| 3-13737 | 2/1991 | Japan . |
| 4-335044 | 5/1991 | Japan . |
| 3-196991 | 7/1991 | Japan . |
| 9101 62363 | 10/1991 | Japan . |
| 5-16273 | 1/1993 | Japan . |
| 1589022 | 7/1981 | United Kingdom . |
| 93/00163 | 1/1993 | WIPO . |
| 93/00390 | 5/1993 | WIPO . |

OTHER PUBLICATIONS

"Microcellular Foams, Lots of R&D, But Little Commercial Action Yet," John De Gaspari, Plastics Technology, Feb. 1993, pp. 63–65.

"The Fabrication of Microporous Polyethylene Having A Negative Poisson's Ration," K. L. Alderson and K. E. Evans, Polymer Report, 1992, vol. 33, No. 20, pp. 4435–4438.

"Thermoplastic Microspheres," Expancel (R), Advertisement of Nobel Industries Sweden Apr. 1991.

*Primary Examiner*—Kristine L. Kincaid
*Assistant Examiner*—Chau N. Nguyen
*Attorney, Agent, or Firm*—David J. Johns; Carol A. Lewis White

[57] ABSTRACT

Improved insulative cable assemblies and methods for producing them are disclosed. The insulative cable assemblies have a conductor housed within a polymeric insulation layer expanded with expandable thermoplastic microspheres. The use of a relatively inelastic outside sheath controls the expansion of the insulative layer and assures a snug fit between the insulation and the conductor. The insulation layer is highly resilient and resistant to dielectric changes due to compression or damage from mechanical manipulation of the cable. Additionally, the ability to expand the insulative layer after cable assembly is completed provides far greater freedom in cable processing without compromising low dielectric constant.

13 Claims, 5 Drawing Sheets

U.S. PATENT DOCUMENTS

| | | | |
|---|---|---|---|
| 4,304,713 | 12/1981 | Perelman | 264/45.9 |
| 4,340,773 | 7/1982 | Perreault | 174/107 |
| 4,373,519 | 2/1983 | Errede et al. | 128/156 |
| 4,483,889 | 11/1984 | Andersson | 427/389.9 |
| 4,520,230 | 5/1985 | Uesugi et al. | 174/107 |
| 4,551,378 | 11/1985 | Carey, Jr. | 428/198 |
| 4,663,095 | 5/1987 | Battais | 264/45.9 |
| 4,837,251 | 6/1989 | Okey et al. | 523/218 |
| 4,959,395 | 9/1990 | Janda | 521/54 |
| 4,985,296 | 1/1991 | Mortimer, Jr. | 428/220 |
| 4,990,544 | 2/1991 | Asaumi et al. | 521/145 |
| 4,996,097 | 2/1991 | Fischer | 428/220 |
| 5,023,279 | 6/1991 | Buckmaster et al. | 521/85 |
| 5,026,591 | 6/1991 | Henn et al. | 428/198 |
| 5,061,561 | 10/1991 | Katayama | 428/364 |
| 5,089,329 | 2/1992 | de Vrieze et al. | 428/313.5 |
| 5,110,998 | 5/1992 | Muschiatti | 174/26 G |
| 5,115,103 | 5/1992 | Yamanishi et al. | 174/24 |
| 5,128,175 | 7/1992 | Yamanishi et al. | 427/54.1 |
| 5,155,138 | 10/1992 | Lundqvist | 521/76 |
| 5,209,967 | 5/1993 | Wright et al. | 428/283 |
| 5,225,635 | 7/1993 | Wake et al. | 174/110 PM |
| 5,238,621 | 8/1993 | Hagen et al. | 264/45.3 |
| 5,429,869 | 7/1995 | McGregor et al. | 428/364 X |
| 5,459,286 | 10/1995 | Bergman et al. | 174/120 R |

ELECTRICAL CABLE WITH IMPROVED INSULATION AND PROCESS FOR MAKING SAME

RELATED APPLICATIONS

The present application is a division application of U.S. patent application Ser. No. 08/166,118, now U.S. Pat. No. 5,468,314 filed Dec. 13, 1993, which is a continuation-in-part of U.S. patent application Ser. No 08/023,642, filed Feb. 26, 1993 now U.S. Pat. No. 5,429,869.

BACKGROUND OF THE INVENTION

1. Field of the Invention

The present invention relates to electrical wires and cables. Specifically, the present invention provides an improved electrical insulation for wires and cables and methods for producing the same.

2. Description of Related Art

One of the constant areas of concern in the production of electrical wires and cables is the need to balance high speed electrical transmission with efficient electrical insulation. One of the more effective insulative materials in this regard is insulation made from polytetrafluoroethylene (PTFE) and particularly insulation made from expanded PTFE (ePTFE), such as that disclosed in U.S. Pat. No. 3,953,566 issued Apr. 27, 1976, to Robert W. Gore. The ePTFE material has many properties which make it particular effective as electrical insulation, including a relatively low dielectric constant, chemical inertness, high strength, low electrical loss, and high use temperature (i.e. thermal stability).

Using various polymer insulation, electrical insulation is commonly produced by either extruding or wrapping an insulative material around a center conductor. Although extruding an insulation around a wire is a very rapid and effective manufacturing technique, certain extrusion processes (e.g. some RAM extrusion techniques) have a constraint that when the polymer insulation is extruded on a wire it tends to have a relatively low "pull-out" resistance. The problem of "pull out" is compounded with materials like PTFE and ePTFE due to their inherent lubricity.

As is disclosed in copending U.S. patent application Ser. No. 023,642, one promising improvement in insulation production comprises combining a PTFE material and thermoplastic expandable microspheres. Such microspheres, which are commercially available under the trademark EXPANCEL® from Nobel Industries Sweden, Sundsvall, Sweden, comprise a thermoplastic shell entrapping a volatile liquid such as isopentane. When subjected to heat or similar activation energy, the microspheres dramatically expand to many times their original size and retain such size when the activation energy is removed. By subjecting the composite of PTFE and microspheres to the required activation energy, an expanded PTFE can be produced. In addition to microsphere expansion, the PTFE can be further expanded mechanically (i.e. before, during or after microsphere expansion) to lower the density of the resulting material even further. These processes produce an electrical insulation with a very low dielectric constant and a high velocity of propagation through the conductor.

While the PTFE and expandable microsphere material can be readily co-extruded over a conductor, it has been observed that when the expandable microspheres are activated, both the inside and outside diameters of the material will increase—causing the insulation to pull away from the conductor. This condition is unacceptable and represents an extreme case of poor wire pull-out resistance.

Although a number of others have experimented with composites of polymers and microspheres to produce electrical insulation, none has suggested some ready means to produce a conductor using such insulation with strong wire pull-out resistance. Some examples of early attempts to combine polymer and microspheres for electrical insulation include: U.S. Pat. No. 4,273,806 issued Jun. 16, 1981, to Stechler (employing naturally occurring microspheres of silica and alumina in a polymer such as polyolefin or polyester); U.S. Pat. No. 5,115,103 issued May 19, 1992, to Yamanishi et al. (employing silica or polymer microspheres in an ultraviolet (u.v.) radiation curable polymer such as fluoroacrylate, silicone, or silicone acrylate); and U.S. Pat. No. 5,128,175 issued Jul. 7, 1992, to Yamanishi et al. (employing heat expandable polymer microspheres in a u.v. curable polymer such as silicone acrylate, silicone, or fluorinated acrylate). In this latter case, the expandable microspheres are expanded in flowing liquid resin, which expands the insulation in a more even manner against a conductor, but does not provide a sufficiently open-cell structure.

In Japanese Laid-Open Application JP 4,335,044, published Nov. 24, 1992, it is taught that an electrical insulation with a low dielectric constant can be produced by mixing PTFE and unexpanded thermoplastic expandable microspheres and then expanding the microspheres to create an electrical insulation around a conductor. While this material does deliver an open-cell structure with low dielectric constant, as is discussed above, co-extrusion of such material around a conductor leads to a loose attachment between the conductor and the insulation once expansion is performed in situ.

An even more serious problem in the manufacture of low dielectric cables is the preservation of low dielectric constants throughout the cable manufacturing process. This is due in large part to a typical direct correlation between dielectric constant and physical and mechanical endurance of the cable (i.e. low dielectric constant insulations are typically characterized by low resistance to mechanical force due to the high void volume and low density required to achieve low dielectric constants). As a result, if care is not exercised during the manufacture and handling of low dielectric cable, the insulative properties of the cable can be dramatically compromised before it is even placed into use.

In the past, a number of solutions have been proposed to address these concerns. For example, "kid-glove" handling techniques have been employed during the manufacture and production of electronic cable in order to reduce and regulate the forces which impact the dielectric material during cable manufacturing. Typical kid-glove techniques include: using reduced tension upon the cable components; reducing the number of rollers and similar equipment which might cause densification; and using special handling of insulation prior to wrapping of the wire or other steps which might apply load to the cable or its parts. Unfortunately nearly all such techniques tend to be costly in labor, equipment, and production throughput rates.

Another approach to limit the damage caused to low-dielectric cables during manufacture uses self-supporting covers placed over insulated conductors to bear any load encountered during subsequent processing. While some improvement may be achieved through this method, increased dielectric constant generally will still occur due to pressures placed upon the insulative material during application of the cover.

The problem of increased dielectric constant due to the cable manufacturing process itself is of particular concern in the production of multiple layered cables, such as coaxial cables. In these instances where a number of different insulative and conductive layers must be combined into a single cable, the likelihood of densification to one or more layers of insulation during this process is a distinct possibility.

Accordingly, it is a purpose of the present invention to provide an electrical cable which incorporates a low dielectric constant which is not adversely affected by the manufacturing process itself.

It is another purpose of the present invention to provide an electrical insulation of a polymer/expandable microsphere composite which snugly surrounds a conductor.

It is a further purpose of the present invention to provide an electrical insulation which can be installed quickly and easily around an electrical conductor.

It is another purpose of the present invention to provide a process for producing an insulated electrical conductor which produces a variety of high speed electrical cables, such as coaxial cables, with minimal need for special handing procedures.

It is still another purpose of the present invention to provide a process for producing an insulated electrical conductor which expands polymer electrical insulation in situ around a conductor while producing a snug fit between the conductor and the insulation.

These and other purposes of the present invention will become evident from review of the following specification.

SUMMARY OF THE INVENTION

The present invention is an improved cable assembly and method for constructing the same. The cable assembly of the present invention comprises one or more electrical conductors, a composite insulation layer of an expandable polymer (such as polytetrafluoroethylene (PTFE)) and expandable thermoplastic microspheres, and a relatively inelastic sheath (i.e. coating, wrapping, shielding, tubing, braid, skin, etc.) jacketed around the conductor and the insulation layer. By expanding the polymer/microsphere composition within the sheath, the composition tends to remain in snug contact with the conductor. This produces a cable with excellent electrical transmission properties while being resistant to wire pull-out. Moreover, cables can be produced in accordance with the present invention with both low dielectric constants and minimal need for special handling techniques.

The present invention employs a variety of construction methods, including various processes for applying the insulation layer to the conductor and for jacketing the conductor and composition within the sheath. The present invention is particularly suited for high-speed production of cable assemblies, especially through co-extrusion processes.

In another embodiment of the present invention, a high-speed cable is produced by expanding insulation surrounding a conductor within a mold, such as a rolling die, which produces a tight fit between the conductor and the insulation without the need for a permanent sheath surrounding the cable.

DESCRIPTION OF THE DRAWINGS

The operation of the present invention should become apparent from the following description when considered in conjunction with the accompanying drawings, in which.

DETAILED DESCRIPTION OF THE INVENTION

The present invention provides an improved insulation for wires and cables and methods for producing such insulation.

As used herein, the term "cable" is intended to encompass any form of conductor (e.g. electrical or optical) housed within some form of insulation. The conductor may include a metallic (e.g. silver or copper) material, non-metallic (e.g. carbon or carbon impregnated) material, or fiber optic (e.g. glass or plastic) material. The cable may take the form of a conventional insulated wire, a coaxial cable, ribbon cable, fiber optic cable, differential pair cable, twisted pair cable, etc.

As is explained in U.S. Pat. No. 3,953,566 to Robert W. Gore, by heating and rapidly mechanically expanding an unsintered fine powder PTFE article in one or two directions through mechanical means, a tetrafluoroethylene polymer material can be created with a micro-structure characterized by nodes interconnected with fibrils. Once sintered to establish expanded dimensional stability, this material is highly porous, has high strength, and has very good electric insulative properties. Among the numerous useful forms of this material is as films/membranes, tubes, rods, and continuous filaments.

Cables can be formed from the expanded PTFE product through a variety of methods. Although this material may placed on a conductor via coextrusion, it is preferred that the expanded PTFE insulation be formed into a tape form and then tightly wrapped around the wire. This produces an effectively insulated wire which is securely housed within its insulation.

In the present invention, PTFE or similar polymers (e.g. ultra-high molecular weight polyethylene) is expanded by employing expandable microspheres blended into the polymer composition. Such microspheres comprise a plastic coating surrounding an expandable liquid or gaseous volatile fluid. U.S. Pat. No. 3,615,972 issued Oct. 26, 1971, to Morehouse et al., teaches thermoplastic microspheres adapted to expand dramatically when exposed to heat. These microspheres are monocellular particles comprising a body of resinous material encapsulating a volatile fluid. When heated, the resinous material of thermoplastic microspheres softens and the volatile material expands--causing the entire microsphere to increase substantially in size. On cooling, the resinous material in the shell of the microspheres ceases flowing and tends to retain its enlarged dimension; the volatile fluid inside the microsphere tends to condense, causing a reduced pressure in the microsphere.

Such thermoplastic microspheres are commercially available from Nobel Industries Sweden, Sundsvall, Sweden, under the trademark EXPANCEL®. These microspheres may be obtained in a variety of sizes and forms, with expansion temperatures generally ranging from 80° to 130° C. Expansion can usually be practiced between 80° and 260° C. or above, depending upon a number of factors, such as dwell time. A typical EXPANCEL microsphere has an initial average diameter of 9 to 17 microns and an average expanded diameter of 40 to 60 microns. According to Nobel Industries, the microspheres have an unexpanded true density of 1250–1300 $kg/m^3$ and an expanded density below 20 $kg/m^3$.

It should be understood that the use of the term "expandable microsphere" herein is intended to encompass any hollow resilient container filled with volatile fluid which is adapted to expand. Although presently available microspheres are essentially ball-shaped particles adapted to expand when exposed to an energy source, it should be understood that such microspheres are quite resilient in their expanded form and can be compressed and released (e.g. through extrusion) to achieve the expansion required for the present invention. Additionally, it may be possible to form such products in a variety of other shapes, such as tubes, ellipsoids, cubes, particles, etc. As such, the term "expandable microsphere" in the context of the present invention is intended to include all applicable forms and uses of these products now known or later developed.

In one presently preferred embodiment of the present invention, EXPANCEL type 091 DU is employed. This product comprises an off-white dry powder with a particle size between 5 and 50 microns. The shell of the microsphere comprises acrylonitrile or methacrylonitrile. The volatile liquid comprises isopentane.

It has been found that by mixing a dry preparation of EXPANCEL microspheres with a dispersion of PTFE or similar polymer and then heating the resulting composition, the polymer will undergo expansion in three-dimensions to achieve a porous network of polymeric nodes and fibrils. A mixture of PTFE, in the form of paste, dispersion or powder, and microspheres, in the form of dry powder or solution, are mixed in proportions of 1 to 90% by weight microspheres, with 5 to 85% by weight of microspheres being preferred. It should be appreciated that a wide range of products may be created even with a percentage of microspheres of merely 0.1 to 5% by weight; similarly, for some uses, filled products may be created with a percentage of microspheres and/or other fillers between 90 to 99 or more percent by weight. Mixture may occur by any suitable means, including dry blending of powders, wet blending, co-coagulation of aqueous dispersions and slurry filler, high shear mixing, etc.

Once mixed, preferably the resulting composition is heated to a temperature of 80 to 180° C. for a period of 0.5 to 10 minutes to activate the microspheres.

With currently available microsphere technology, if further density reduction is desired, the composition may be re-heated to a temperature of 40° to 240° C. and mechanically expanded through any conventional means, such as those disclosed in U.S. Pat. No. 3,953,566. In fact, it should be appreciated that the present invention is believed to lend itself to incorporation with many existing mechanical expansion techniques, whether before, during and/or after microsphere expansion.

The resulting products have proven to have superior properties. When formed around a wire conductor, the composition has proven to be an excellent electrical insulation, with typical dielectric constants of 1.04 to 1.25, and typical velocities of propagation of 89–98%. Moreover, unlike some presently employed low dielectric insulations which must be carefully handled to avoid damage or compromise of the insulative properties, the insulation of the present invention is particularly resistant to deformation and compromise from mechanical working.

Depending on application, insulations can be created with virtually any dielectric constant within the above described ranges or greater. From experimentation to date, it has been shown that insulations with dielectric constants of lower than 1.12 and 1.06 can be readily produced using the present invention. As such, in conjunction with the other unique properties of this material, compositions made in accordance with the present invention have tremendous applications in a wide variety of electrical applications, and particularly in wires, high VP cable, sheathing, and similar applications.

The compositions of the present invention have a number of other desirable properties, such as thermal insulation, buoyancy, padding, selective solvent permeability, moldability, extremely low densities, selective expandability, dimensional stability (even in an unsintered form), and exceptional elasticity/resilience to deformation. Additionally, many of these properties can be particularly useful in the construction of unique cable configurations, such as using selective expandability of the insulative material to produce cables with changes in impedance along its length.

One of the desirable properties as an electrical insulation is the composition's ability to "puff" into a resilient cushion-like coherent mass with substantial proportions of open air spaces therein. The mass can expand in all dimensions and remains highly self-cohesive despite the dramatic increase in its dimensions and typical air space contents from 10 to 50 to 80% or more. Although not necessary, by mechanically expanding the PTFE/microsphere composition in addition to the microsphere expansion, the resulting product becomes even less dense.

This "puffed" mass has proven to be remarkably elastic and resilient to deformation. For instance, a typical expanded mass will withstand compression of 50% or more with nearly 100% rebound to original shape.

The expansion ability of the present invention lends itself to readily producing many previously expensive or unavailable insulated conductors. For example, conductors with extremely low dielectric constants must be very carefully handled during the manufacturing process to avoid any densification of the insulation. Such densification can both increase the dielectric of the conductor and cause distortion to the electrical signal traveling through the conductor. These problems are particularly problematic in conductors incorporating multiple layers of conductors, insulation and/or shielding, and those requiring high signal throughput. Among the more difficult cables in this regard are high speed coaxial cables, which presently must be manufactured using "kid-glove" processing steps with absolutely minimal twisting, bending or other mechanical manipulating of the assembled cable once insulation is installed.

The present invention can vastly simplify the processing steps required to produce such insulation by providing two important properties to the assembled cable. First, by providing an insulation with expandable microspheres embedded therein, the cable can be constructed using normal assembly techniques with little concern about densification. Once the cable has been completely assembled, the insulation is then expanded in place to produce its full insulative properties. This provides low dielectric cable without fear of densification during the assembly process.

Second, the resilient nature of insulation produced in accordance with the present invention is far less prone to damage due to mechanical working of the cable. By employing expandable microspheres within the insulation, the insulation is less likely to become permanently crushed or damaged during normal assembly, shipping, and installation procedures. As a result, cables of the present invention retain their original dielectric constants more consistently than previous electrical insulators.

Figure 1:
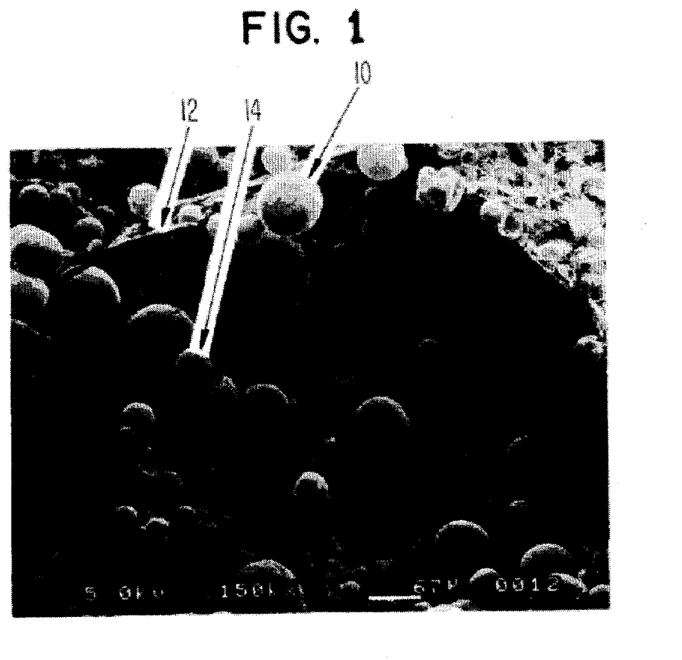
FIG. 1 is a scanning electron microscopic (SEM) image of a composition employed in the present invention, enlarged 150×.
Figure 2:
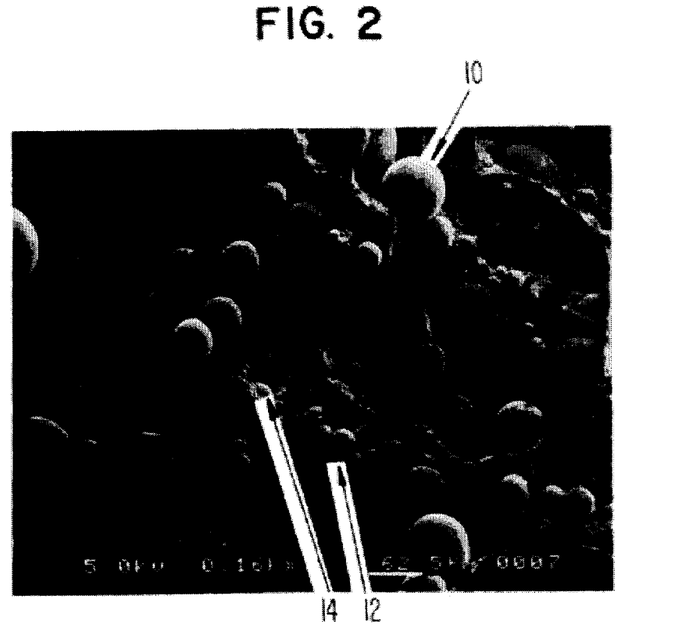
FIG. 2 is an SEM image of a composition of the present invention, enlarged 150×.

The resilient properties of the present invention may be better understood by examination of scanning electron microscopic (SEM) images of expanded compositions made in accordance with the present invention. FIGS. 1 and 2 show SEM images of compositions of the present invention enlarged 150 times. As can be seen, the composition comprises many expanded microspheres 10 interconnected by polymeric fibrils 12 (i.e. thread-like elements) and nodes 14 (i.e. particles from which fibrils emerge). This "scaffold" or "lattice" structure of fibrils and nodes incorporating microspheres defines substantial areas of open air spaces within the composition. It is believed to be both the voids within the microspheres 10 and these air spaces which create many of the unique properties of this composition.

Figure 3:
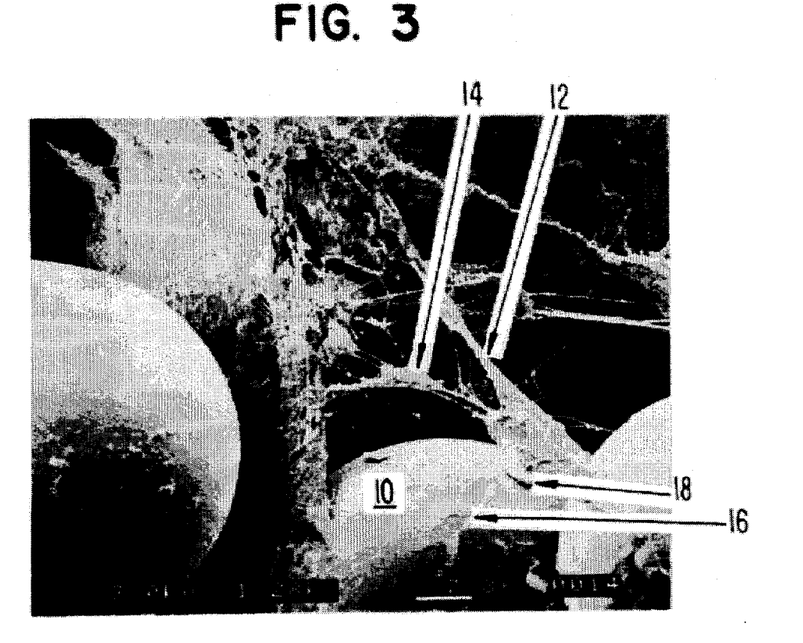
FIG. 3 is an SEM image of a composition of the present invention, enlarged 1280X.

The particular relationship between the microspheres and the polymer can be better seen in the SEM image of FIG. 3. In this image, magnified 1280 times, the microspheres 10 can be seen attached to and embedded within fibrils 12 and nodes 14. As is shown, the polymer actually becomes attached to the microspheres, apparently with some fibrils 16 extending directly from the microspheres 10 and some nodes 18 attached directly to the surface of the microspheres 10.

Although the polymer/microsphere composition has proven to be a very effective electrical insulation, its application to a conductor tends to be limited to conventional methods for applying an expanded PTFE insulation, primarily through wrapping of an expanded tape around the conductor. Among the deficiencies of this process is that it is time consuming and tends to reduce the desirable low density (i.e. "puffed") nature of the product.

It is preferred to coat the conductor with the polymer/microsphere composition before the microspheres are expanded and then expanding the microsphere in place on the conductor. Not only can the insulative jacket be applied faster and with less expense using this process, but the expansion of the insulation in situ is also believed to provide better electrical and mechanical properties. Regrettably, in some instances it has been found that the activation of the polymer/microsphere composition in place tends to expand the insulation layer away from the conductor—leaving the wire subject to pull-out. This condition is particularly evident when the insulation is co-extruded around the conductor and then expanded.

Figure 4:
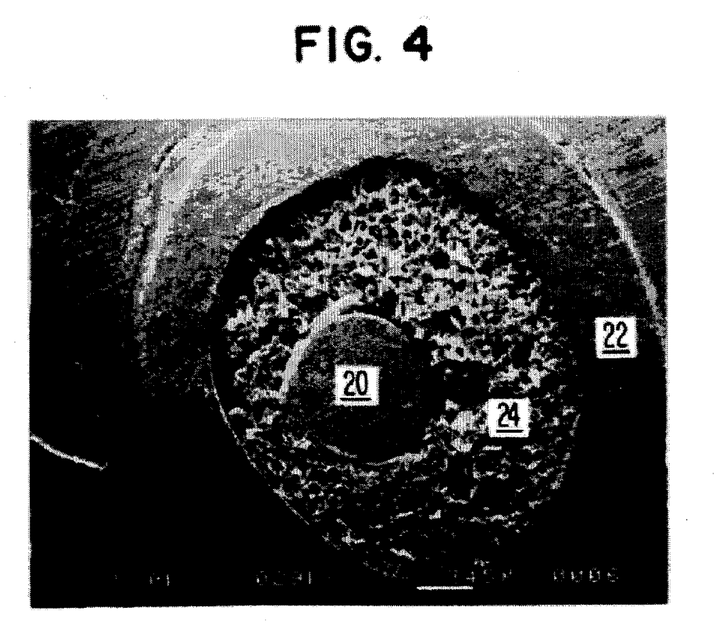
FIG. 4 is a cross-sectional SEM image of a conductive substrate (wire) coated with the composition of the present invention and contained within a sheath, enlarged 30×.

The present invention addresses these concerns by constricting the in situ expansion of the polymer/microspheres around the conductor to force the composition to form a snug fit with the conductor. As is shown in FIG. 4, a conductor 20 is housed within a relatively inelastic sheath material 22, such as PTFE or acrylic. By partially filling the sheath 22 or coating the conductor 20 with the polymer/microsphere composition 24 of the present invention, the composition can be expanded to fill in the sheath thoroughly and provide an even coating around the conductor 20. An alternative coating may be created by heating the conductor itself to institute composition expansion.

It has been found that so long as the sheath is less elastic than the expanding polymer/microsphere composition, the composition tends not to pull away from the conductor, but, rather, will expand to fill the space between the conductor and the sheath and produce a snug fit between the insulation and the conductor.

In conjunction with the sheath, the unexpanded composition can be provided on the conductor in a variety of methods. Some illustrative examples of application methods include:

(1) It has been determined that the composition of the present invention will adhere to the conductor by merely dipping the conductor in the composition. This allows the conductor to be first dip-coated and then placed within a sheath where expansion energy can be applied;

(2) The sheath itself can be filled with the composition and then the wire can be inserted therethrough;

(3) The composition can be extruded on the conductor and then bonded firmly together through application of expansion energy once the conductor and composition are placed in a sheath. The sheath may also be co-extruded in this process or added through an additional step;

(4) The composition containing unexpanded microspheres can be formed as a tape which can be wrapped either loosely or tightly (depending on particular needs) around the conductor. Once wrapped and housed within a sheath, activation energy can be applied to form a snug fit of insulation around the conductor; and (5) The composition and a PTFE shell can be formed into a single pellet and then relatively easily co-extruded around a conductor.

Figure 5:
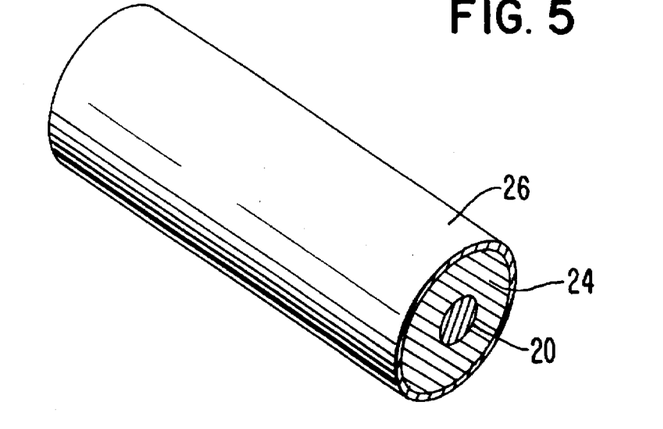
FIG. 5 is a three-quarter elevational view of a cable formed with a continuous sheath in accordance with the present invention.

As is shown in FIG. 5, the preferred sheath 26 comprises a continuous tube which surrounds the composition 24 and conductor 20. Depending upon desired properties of the final product, the sheath can be created from either a conductive or non-conductive material. The sheath 26 may comprise any dimensionally stable material, such as a metal (e.g. copper, aluminum, or steel braided shielding), or a polymer such as polyethylene, polyolefin (e.g. PTFE), fluorinated ethylenepropylene (FEP), polystyrene, ethylene-chlorotrifluoroethylene (ECTFE), ethylenetetrafluoroethylene (ETFE), or perfluoroalkoxy polymer (PFA). For most applications, ideally the sheath should have low dielectric constraint and good mechanical properties.

The sheath may be applied by a wide variety of methods, such as through extrusion, wrapping, braiding, drawing, serving, dipping, plating, dropping and blocking, etc. Additionally, as is explained below, the sheathing can be installed only temporarily and then removed once the insulation is expanded in place (such as through use of a removable mold during the production of a cable). Preferably, the sheath comprises a braid, wrap, or extrusion applied around either unexpanded or pre-expanded insulation.

Figure 6:
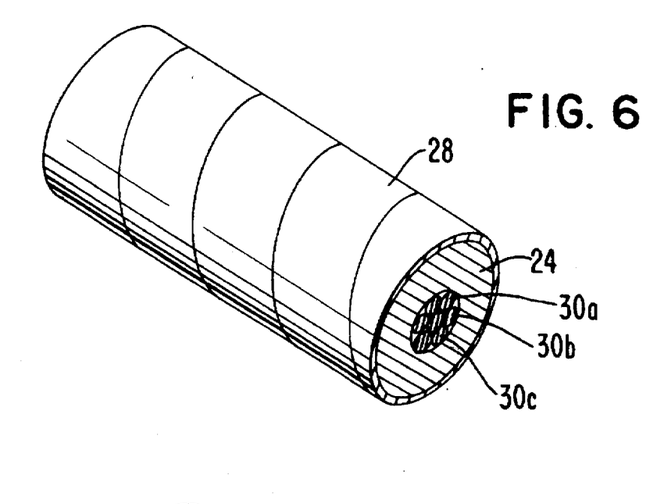
FIG. 6 is a three-quarter elevational view of a cable formed with a helically wrapped sheath in accordance with the present invention.

Examples of some of these methods for applying the sheath are set forth in greater detail below. As is illustrated in FIG. 6, the sheath may also be applied as a tape 28 wrapped around the insulation 24. Although the tape may be merely folded around the composition 24, it is preferred to spiral wrap the sheath around the composition 24 in the manner shown to provide a secure fit. FIG. 6 further illustrates that multiple conductors 30a, 30b, 30c can be readily provided within the cable without departing from the present invention.

Figure 7:
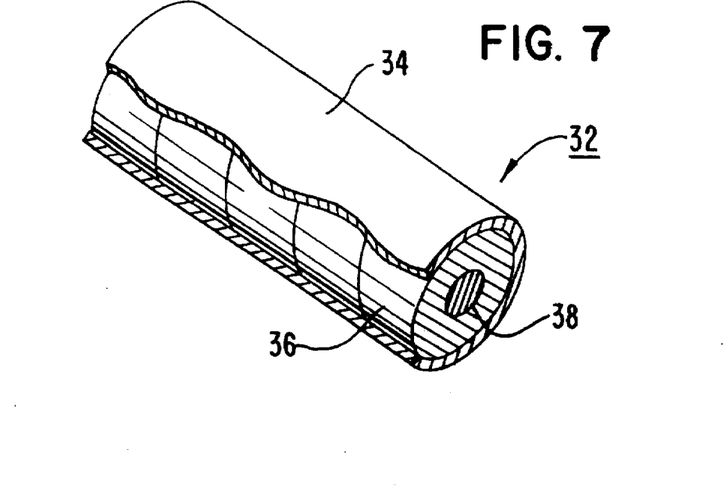
FIG. 7 is a three-quarter elevational view of a cable formed with a helically wrapped insulation layer in accordance with the present invention, with a section of the sheath layer shown partially cut-away.

Shown in FIG. 7 is a cable 32 constructed with a continuous sheath 34 and a composition layer 36 comprising a tape wrapped around the conductor 38. As has been explained, a cable of this structure can be formed by providing a tape with unexpanded microspheres embedded therein, wrapping the tape around a conductor, jacketing the wrapped conductor in a sheath, and then applying activation energy to cause the tape to expand to completely fill the space between the conductor and the sheath. This construction method produces a very snug connection between the insulation and the conductor. It should be understood that the sheath may likewise be wrapped around the tape 36, as is shown in FIG. 6, to form an even tighter fit.

One of the advantages in applying the composition as a tape is that it provides a ready means to provide further mechanical expansion of the tape. As has been explained, this permits the density of the insulation to be lowered further, decreasing the weight of the insulation layer and increasing its void content. It may also be possible to expand the composition mechanically while in place on the conductor. Such in situ mechanical expansion may be particularly viable with certain conductors, such as PTFE filled with a conductive filler, which will accommodate stretching along with the insulative layer.

It has been determined that certain other polymers will also expand in the presence of expandable microspheres in the manner described to create a lattice of polymeric nodes and fibrils and air spaces. As is explained in the following examples, expansion to form polymeric nodes and fibrils and air spaces has been achieved by using similar processes in conjunction with ultra-high molecular weight polyethylene polymer. Applicants believe that comparable results may also be achieved by employing the present invention with other long-chain polymers, particularly those with a high modulus of crystallinity, e.g.,: polypropylene, polyvinyl alcohol (PVA), poly(ethylene terephthalate)(PET), etc.

The preferred materials for an extruded sheath are those materials that demonstrate good strength at the temperatures that are typically used for puffing and offer low dielectric constant. However, it should be appreciated that the amount of insulative properties required is dependent upon whether the sheath is to function as part of a dielectric system or as an electrical shield. The best examples being fluoropolymer resins such as FEP or PFA that both have a dielectric constant of about 2.15, and PTFE with a dielectric constant of about 2.15 and expanded PTFE with a dielectric constant of about 1.2 to 1.5. All these resins soften at temperatures above 200° C. making them good choices for this application. Alternative resins could be used for this application such as polyethylene (dielectric constant 2.2) if the insulation is puffed inductively by heating the wire so as not to melt the polyethylene.

While the presently preferred embodiments of the present invention employ expanded insulation permanently mounted within a sheath, as has been noted, it is also contemplated that insulation of the present invention may be created with a removable sheath. In this instance, the sheath may comprise merely a removable covering, such as a jacket or mold that can be easily removed, stripped off or dissolved after the insulation has been expanded.

Figure 8:
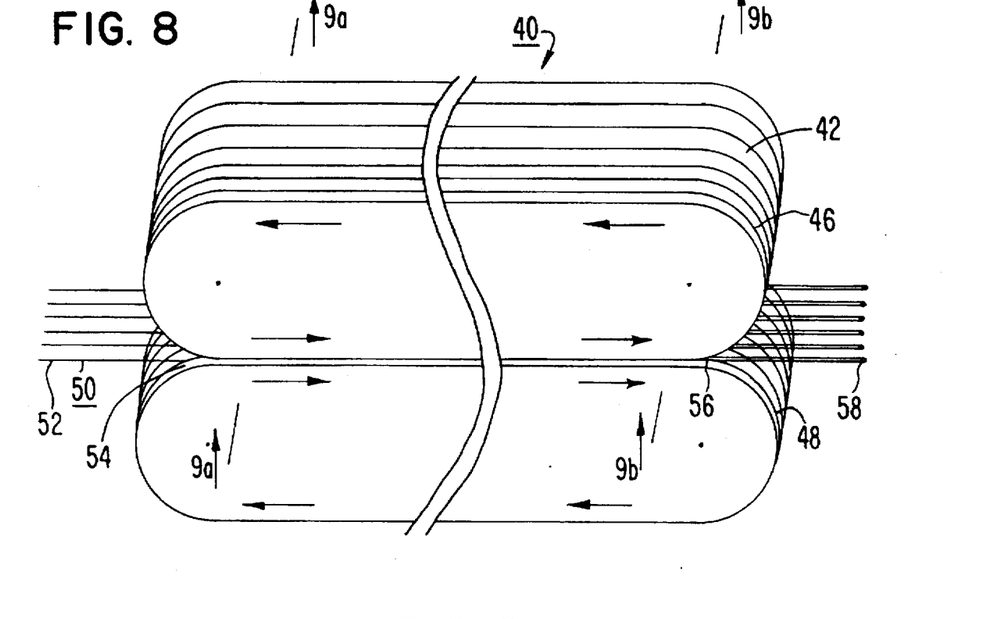
FIG. 8 is a partially schematic three-quarter isometric view of a rolling die apparatus for producing a cable in accordance with the present invention without the need for a permanently installed outer sheath.
Figure 9A:
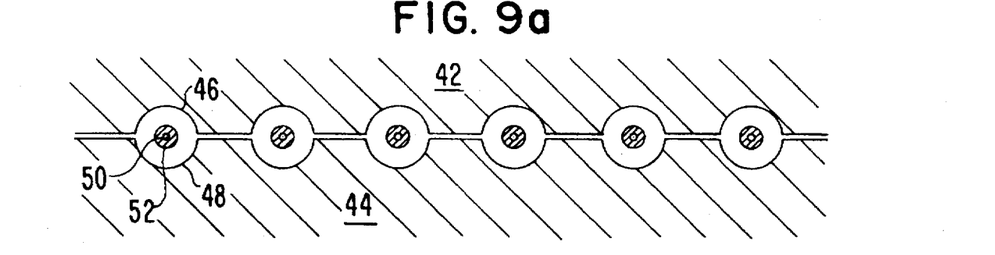
FIG. 9a is a cross-section view of rolling die apparatus along line 9a—9a of FIG. 8, with the insulation layer shown unexpanded.
Figure 9B:
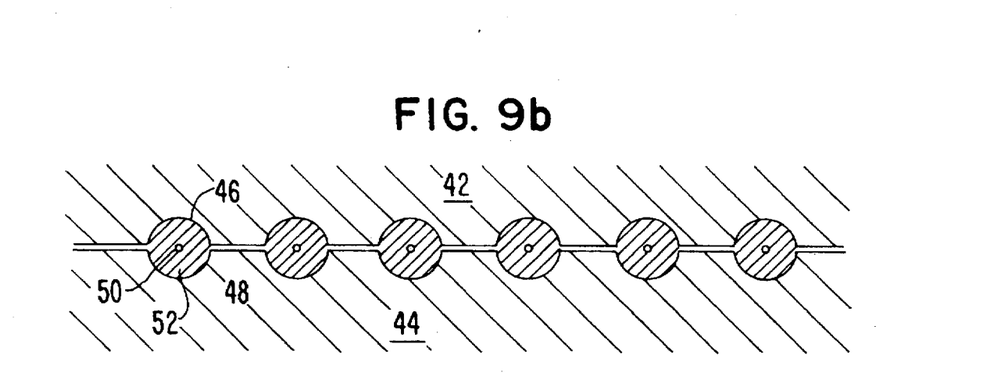
FIG. 9b is a cross-section view of rolling die apparatus along line 9b—9b of FIG. 8, with the insulation layer shown expanded.
Figure 10:
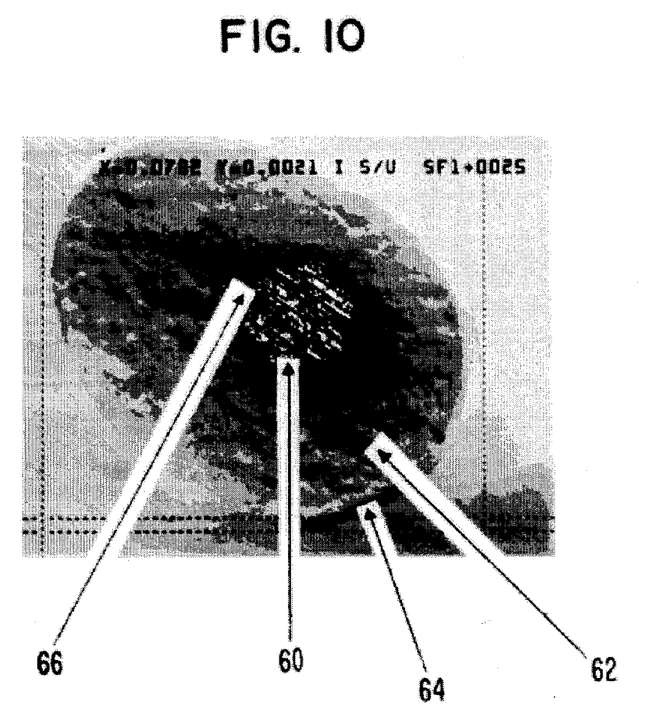
FIG. 10 is an SEM image of a cross-section of a cable made in accordance with Example 6B before expansion, enlarged approximately 40 times.

For continuous processing, the sheath may comprise a mold that is automatically removed after expansion. One possible apparatus 40 for use in this respect is shown in FIGS. 8 through 10. The apparatus 40 comprises a pair of abutting rolling surfaces 42, 44, (e.g. metal belts) each having a series of corresponding grooves 46, 48 therein. Traveling within the corresponding grooves 46, 48, conductors 50 coated with unexpanded insulation 52 are fed through the apparatus 40 from a first end 54 to a second end 56.

In order to expand the insulation, expansion energy is applied to the rolling surfaces 42, 44 at the first end 54 of the apparatus. For instance, a heating element can be included within the rolling surfaces capable of producing sufficient heat to quickly expand the insulation 52 around and into tight contact with the conductor 50. At the second end 56 of the apparatus, a completed cable 58 is removed with now unsheathed insulation 52 fully expanded and in tight contact with the conductor 50. If desired, a cooling element may be provided at the second end 56 of the apparatus to ease in the separation of the cable 58 from the grooved surfaces. As is shown, it is possible to produce numerous cables through this process simultaneously.

There are many contemplated advantages of this expansion apparatus. For example, abutting rolling surfaces maintain the insulation in the same relative position with the mold during the entire expansion process, avoiding dragging or other possibly damaging mechanical manipulation of the cable. Additionally, the abutting rolling surfaces allows for cable to be produced with varying widths of insulation along its length (e.g. grooved, spiral, or undulating surfaces) to fulfill various operational or market needs. The straight wire path also assures minimal mechanical damage to the insulative layer during the expansion process. The apparatus may likewise be used to fully or partially expand insulation housed in a separate sheath to impart particular operational properties or to assure proper restraint of the insulative layer during expansion.

Without intending to restrict the scope of the present invention, the following represent examples of how the present invention may be employed.

EXAMPLE 1

A slurry was mixed consisting of 20.94 g of PTFE in the form of a 60.0% dispersion and 27.88 g of EXPANCEL—091 DU and 3.5 g of distilled water. This yields a solids content of 43% PTFE to 57% EXPANCEL. The PTFE dispersion used was part number TE 30, an aqueous dispersion obtained from E. I. duPont de Nemours and Company, Wilmington, Del.

A 24 gauge silver plated copper wire was "dipped" coated with the above slurry by inserting the wire through a small hole in the bottom of the mix container and drawing the wire upwards through the bath. The wire was then hung vertically to dry for approximately 30 minutes at ambient conditions.

The 1.07 m (3.5 ft) section of dried coated wire was inserted inside an expanded PTFE tube (e.g. tubing produced according to Gore U.S. Pat. No. 3,953,566) of the same length having an inside diameter (I.D.) of 2 mm, an outside diameter (O.D.) of 3 mm, and a porosity of 70%. The assembly was then placed in a convection oven for 3 minutes at 165° C. in order to puff the wire coating so that it fills the annular space between the wire and the PTFE tubing. The sample was removed and allowed to cool. The density of the puffed coating was calculated to be 0.096 g/cc using the known weight and volume of the puffed coating.

The wire assembly was then helically wrapped with aluminized polyester film and tested for velocity of propagation (V.P.). A Techtronics Model CSA 803 was used in TDR mode (time domain reflectometry) to measure velocity of propagation. A cable length of 1.67 m (5.47 ft) was measured to have a signal delay of 3.461 ns/m (1.055 ns/ft), which converts to a signal speed of $2.889 \times 10^8$ meters/sec. This signal speed divided by the speed of light in a vacuum $(2.998 \times 10^8$ m/s) yields a V.P. of 96.36%. From this value, the dielectric constant (Er) can be calculated using the equation: V.P.=1/!Er. Er for this cable calculates to be 1.077.

EXAMPLE 2

A slurry was mixed consisting of 7.36 g of PTFE in the form of a 60.0% dispersion and 13.67 gms of EXPANCEL—091 DU and 4.5 g of distilled water. This yields a solids content of 35% PTFE to 65% EXPANCEL. The PTFE dispersion used was part number TE 30, an aqueous dispersion obtained from Dupont Company.

A 33 gauge silver plated copper wire was dipped coated with the above slurry by inserting the wire through a small hole in the bottom of the mix container and drawing the wire upwards through the bath. The wire was then hung vertically to dry for approximately 30 minutes at ambient conditions.

The 1.07 m (3.5 ft) section of dried coated wire was inserted inside a 43 mil I.D. copper tube of the same length. The assembly was then placed in a convection oven for 4 minutes at 165° C. in order to puff the wire coating so that it fills the annular space between the wire and the copper tubing. The sample was removed and allowed to cool.

A Techtronics Model CSA 803 was used in TDR mode (time domain reflectometry) to measure velocity of propagation. A cable length of 0.988 m (3.240 ft) was measured to have a signal delay of 3.402 ns/m (1.037 ns/ft), which converts to a signal speed of $2.939 \times 10^8$ meters/sec. This signal speed divided by the speed of light in a vacuum $(2.998 \times 10^8$ ms) yields a V.P. of 98.03%. From this value, the dielectric constant (Er) was calculated to be 1.041.

EXAMPLE 3

The following procedure was used for making films of ultra-high molecular weight polyethylene (UHMW-PE) containing 50% EXPANCEL—091 DU by weight.

Solutions of UHMW-PE were prepared in a jacketed reaction vessel capable of maintaining solutions temperatures in excess of 130° C. The vessel was purged with flowing nitrogen. The vessel was also fitted with a thermocouple for determining the solution temperature, and a stirring paddle.

1. The vessel was initially heated to approximately 79° C., at which time 200 g of reagent grade mixed xylenes were added, and equilibrated at temperature.

2. To the stirring solvent, 4.0 g of Hostalon GUR 412 and EXPANCEL—091 DU were slowly added. In addition, 0.04 g of an antioxidant, (IRGANOX 1010) was added.

3. With continued stirring, the temperature of the oil bath was raised to 123° C. Stirring was stopped when the solution temperature reached 117° C., and the stirring paddle was removed. The solution was allowed to equilibrate at temperature for 30 minutes.

4. After equilibration, the hot solution was poured into a glass dish, and loosely covered with aluminum foil. The foil was removed after 30 minutes, and the solvent evaporated overnight.

A piece of the resulting product from the above procedure was measured to be 4.70 cm long, 1.10 cm wide, and 0.358 cm thick, a weight of 0.570 g, and a calculated density of 0.308 g/cc. This piece was placed in a convection oven at 165° C. for 5 minutes and removed. The sample had a puffed appearance. A piece was cut from the puffed sample and was measured to be 8.92 cm long, 2.04 cm wide, and 0.767 cm thick, a weight of 0.534 g, and a calculated density of 0.038 g/cc.

EXAMPLE 4

A process was tested for continuous processing of a thermoplastic extruded covering over a wire with a dip coating of an insulation of the present invention. A 30 awg wire (0.010 inch) was coated with a mixture of PTFE and expandable microspheres. The mixture of PTFE and expandable microspheres comprised a slurry mixed in the manner of Example 1 with a solids content of 50% PTFE and 50% EXPANCEL DU 091. Coating was accomplished by drawing the wire through a cup filled with the mixture and exiting through an extrusion tip with a 0.762 mm (0.03 inch) inside diameter (I.D.). Water in the mixture was removed by running the coated wire through a drying tube at about 107° C.

The coated wire was then run through the crosshead of a conventional thermoplastic extruder where a polyethylene skin was applied using a 4.45 mm (0.175") outside diameter (O.D.) tip and a 5.06 mm (0.199") I.D. die. Polyethylene has a melt temperature of about 162° C. at 2.8 revolutions per minute (RPM) screw speed in a screw extruder. The wire was drawn through the extruder at about 274 cm/min (9 ft/min). The diameter of the wire was measured using an in-line laser gauge, and found to be about 2.03 mm (0.08"). The capacitance was measured in-line at 29 pf/m (8.9 pf/ft). This calculates to a dielectric constant of about 1.1.

The conductor was sandwiched within a simulated shield (comprising two insulated planar boards having an aluminum/MYLAR shield applied to the inside surfaces of each) and velocity of propagation (V.P.) was measured along it. After the sample was puffed, a V.P. of 95.4% was achieved, calculating to a dielectric constant of 1.099.

EXAMPLE 5A

A 5% EXPANCEL® 95% PTFE by weight sample was made by the following method: A slurry of 7.8 g of EXPANCEL—091 DU obtained from Nobel Industries, 1519 Johnson Ferry Road, Marietta, Ga. 30062, and 551.2 g of de-ionized water was prepared in a 2 liter baffled stainless steel container. While the slurry was agitated at 800 RPM, 148.2 g of PTFE in the form of a 20.0% dispersion was rapidly poured into the vessel. The PTFE dispersion was an aqueous dispersion obtained from ICI Americas, Inc. After 30 seconds, 2.2. g of a 0.4% solution of a cationic modified polyacrylimide was added to initiate the co-coagulation. After a total of 1 minute, 20 seconds, the mixer was stopped. The coagulum settled to the bottom of the vessel and the effluent was clear.

The coagulum was dried at 110° C. in a convention oven. The dried cake was chilled below 0° C. The cake was then hand ground through a 0.635 cm mesh stainless steel screen. A sample of the screened powder was lubricated with mineral spirits at a ratio of 0.375 cc solvent per gram of powder.

A 19.1 mm O.D.×12.7 mm I.D. pellet was formed in a cylinder at $8.3\times10^6$ N/m$^2$ material pressure. The pellet was then extruded onto a 26 gauge, 7 strand wire (O.D. 0.480 mm (0.0189")) using a 0.813 mm (0.032") tip and a 1.207 mm (0.0475") die.

EXAMPLE 5B

A 15% EXPANCEL® 85% PTFE by weight composition was made by using the same method as Example 5A except the following components amounts were used:

A slurry of 23.4 g of EXPANCEL—091 DU and 613.6 g of de-ionized water;

132.6 g of PTFE in the form of a 20.0% dispersion;

2.1 g of a 0.4% solution of a cationic modified polyacrylimide;

A sample of screened powder was lubricated with mineral spirits at a ratio of 0.375 cc solvent per gram of powder.

Using the same pelleting and extrusion equipment and conditions as is set forth in Example 5A, the material was again extruded onto a 26 gauge 7 strand wire.

EXAMPLE 5C

A 15% EXPANCEL® 85% PTFE by weight composition was made in accordance with Example 5B. A pellet was also made in accordance with Example 5B. The pellet was then extruded onto a 26 gauge, 7 strand wire using a 1.473 mm (0.058") tip and a 1.740 mm (0.0685") die.

EXAMPLE 6

A PFA sheath was screw extruded over each of the above described Examples 5A, 5B, and 5C, producing new Examples 6A, 6B, and 6C, respectively. In each instance, the conditions for application of the PFA skin were as follows: a tip with a O.D. of 4.45 mm (0.175"); a die with an I.D. of 5.51 mm (0.217"); RPM of 3.0; line speed of 1067 cm/min (35 ft/min); and melt temperature of 353° C.

The samples were cross sectioned prior to puffing and sectioned again after being puffed for 3 minutes at 160° C. FIG. 10 is a SEM showing a cross-section of the cable of Example 6B prior to expansion. The cable comprises a multiple strand metal conductor 60, an unexpanded insulative layer 62, and an outer sheath 64. A distinct gap 66 is visible between the conductor 60 and the insulative layer 62.

Figure 11:
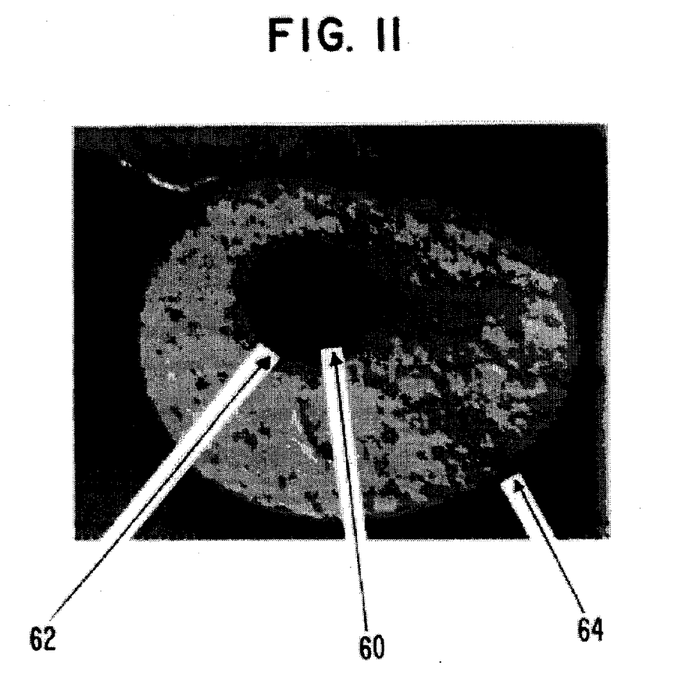
FIG. 11 is an SEM image of a cross-section of a cable made in accordance with Example 6B after expansion, enlarged approximately 40 times.

FIG. 11 shows the cross-section of cable of Example 6B after puffing. In this instance, the insulation layer 62 is expanded into tight contact with the conductor 60.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An energy conductive cable which comprises a conductor;

a layer of expanded insulation surrounding the conductor, the layer of insulation comprising a composite of polymer expanded to form a lattice of nodes interconnected by fibrils, and expanded expandable microspheres intermixed within the nodes and fibrils;

a sheath surrounding the insulation, the sheath being less elastic than the insulation layer;

wherein the insulation layer comprises an expanded layer with a snug fit between the sheath and the conductor.

2. The cable of claim 1 wherein the sheath comprises a strip of material wrapped around the conductor and the insulation.

3. The cable of claim 2 wherein the strip of material is dimensionally stable.

4. The cable of claim 1 wherein the sheath comprises a continuous tube of material surrounding the conductor and the insulation.

5. The cable of claim 4 wherein the continuous tube of material comprises a dimensionally stable polymer selected from the group consisting of polytetrafluoroethylene, expanded polytetrafluoroethylene, polyethylene, fluorinated ethylene propylene (FEP), ethylene-tetrafluoroethylene, ethylene-chlorotrifluoroethylene, perfluoroalkoxy polymer, and polypropylene.

6. The cable of claim 4 wherein the sheath comprises the continuous tube which is co-extruded around the conductor and the insulation.

7. The cable of claim 1 wherein the polymer is selected from the group consisting of polytetrafluoroethylene and ultra-high molecular weight polyethylene.

8. The cable of claim 1 wherein the insulation comprises a tape wrapped around the conductor.

9. The cable of claim 1 wherein the insulation comprises an expanded mass of low density derived both through the expansion of the microspheres and through mechanical expansion.

10. An electrical cable which comprises at least one conductor;

a resilient layer of expanded insulation surrounding the conductor, the layer of insulation comprising a composite of a polymer and expandable microspheres intermixed within the polymer;

a sheath containing the expanded insulation;

wherein the cable has a low dielectric constant and is resistant to increased dielectric caused by forces applied against the cable.

11. The cable of claim 10 wherein the cable comprises a coaxial cable.

12. The cable of claim 11 wherein the cable has a dielectric constant of less than 1.25.

13. The cable of claim 10 wherein the resilient insulation layer snugly surrounds the conductor.

* * * * *